United States Patent [19]

Kud et al.

[11] Patent Number: 4,849,126

[45] Date of Patent: Jul. 18, 1989

[54] USE OF GRAFT POLYMERS BASED ON POLYESTERS, POLYESTER URETHANES AND POLYESTER AMIDES AS GRAYNESS INHIBITORS IN DETERGENTS

[75] Inventors: Alexander Kud, Eppelsheim; Wolfgang Trieselt, Ludwigshafen; Heinrich Hartmann, Limburgerhof, all of Fed. Rep. of Germany

[73] Assignee: BASF Aktiengesellschaft, Ludwigshafen, Fed. Rep. of Germany

[21] Appl. No.: 179,414

[22] Filed: Apr. 8, 1988

[30] Foreign Application Priority Data

Apr. 9, 1987 [DE]  Fed. Rep. of Germany ....... 3712069

[51] Int. Cl.$^4$ ............................................... C11D 3/06
[52] U.S. Cl. ........................... 252/174.23; 252/174.21; 252/DIG. 2; 252/DIG. 15; 525/48; 525/426; 525/455
[58] Field of Search ................. 252/DIG. 2, DIG. 15, 252/174.21, 174.23; 525/48, 426, 455

[56] References Cited

U.S. PATENT DOCUMENTS

| 3,557,039 | 1/1971 | McIntyre et al. | 524/605 |
|---|---|---|---|
| 3,977,954 | 8/1976 | Needles et al. | 525/426 |
| 4,100,127 | 7/1978 | Fukusaki et al. | 523/502 |
| 4,240,918 | 12/1980 | Lagasse et al. | 252/174.23 |
| 4,597,898 | 7/1986 | Vander Meer | 252/174.23 |
| 4,636,545 | 1/1987 | König et al. | 525/455 |
| 4,664,848 | 5/1987 | Oh et al. | 252/174.23 |
| 4,676,921 | 6/1987 | Vander Meer | 252/174.23 |
| 4,724,095 | 2/1988 | Gresser | 252/174.23 |
| 4,738,787 | 4/1988 | O'Lenick, Jr. et al. | 252/174.23 |
| 4,746,456 | 5/1988 | Kud et al. | 252/174.23 |

FOREIGN PATENT DOCUMENTS 1154730  6/1969  United Kingdom .

Primary Examiner—Paul Lieberman
Assistant Examiner—Willie J. Thompson
Attorney, Agent, or Firm—Joseph D. Michaels

[57]  ABSTRACT

Detergents contain graft polymers obtainable by grafting (a) polycondensates based on polyesters, polyester urethanes and polyester amides and having in each case a number average molecular weight from 500 to 100,000 with (b) from 0.2 to 10 parts by weight, based on 1 part by weight of the polycondensates, of vinyl esters of saturated $C_1$- to $C_6$-carboxylic acids, acrylic and/or methacrylic esters of saturated monohydric alcohols containing 1 to 4 carbon atoms.

12 Claims, No Drawings

USE OF GRAFT POLYMERS BASED ON POLYESTERS, POLYESTER URETHANES AND POLYESTER AMIDES AS GRAYNESS INHIBITORS IN DETERGENTS

US Pat. No. 3,557,039 discloses stable aqueous dispersions of polymers preparable by condensation of terephthalic acid or dimethyl terephthalate with ethylene glycol or polyethylene glycol of an average molecular weight from 1,000 to 4,000. The molar ratio of ethylene terephthalate:polyethylene terephthalate units is from 2:1 to 6:1. The dispersions are used for treating the surfaces of polyester articles.

GB Pat. No. 1,154,730 discloses that, in the washing of textile material, the redeposition of soil on the textile material can be prevented by adding to the detergent-containing wash liquor polycondensates containing either ester or amide repeat units. These additives are for example condensation products as described in said U.S. Pat. No. 3,557,039 which are obtainable by condensation of dimethyl terephthalate, ethylene glycol and polyethylene glycol of a molecular weight of 1,500. In place of the polyethylene glycol it is also possible to use $\alpha,\omega$-diaminopolyethylene glycols in the condensation. The condensation may additionally be carried out in the presence of caprolactam.

German Laid-Open Application DE-OS No. 2,706,914 discloses a process for preparing liquid resin dispersions where ethylenically unsaturated monomers, such as acrylic esters or vinyl esters, are grafted onto a polyester dispersion. The polyester has an average molecular weight from 500 to 5,000 and is prepared by condensing at least one ester-forming polyol, for example, 4,4'-bis($\beta$-hydroxyethoxyphenyl)-2,2-propane with polyalkylene glycol. The polyester dispersions thus obtained are used as film-forming material for adhesives, paints and inks and also as impregnants and as binders for glass fibers.

It is an object of the present invention to provide improved polycondensate-based grayness inhibitors for detergents.

We have found that this object is achieved according to the invention by using as grayness inhibitors in detergents graft polymers obtainable by grafting
 (a) polycondensates based on polyesters, polyester urethanes and polyester amides of a number average molecular weight from in each case 500 to 100,000 with
 (b) from 0.2 to 10 parts by weight, based on 1 part by weight of polycondensate, of vinyl esters of saturated $C_1$- to $C_6$-carboxylic acids, acrylic and/or methacrylic esters of saturated monohydric alcohols containing 1 to 4 carbon atoms.

The polycondensates to be used as component a) for preparing the graft polymers are partly known from said U.S. Pat. No. 3,557,039 (incorporated by reference), partly from GB Pat. No. 1,157,730 (incorporated by reference). The polyesters are prepared by condensation of dicarboxylic acids or esters thereof with glycols and/or polyalkylene glycols in the presence of customary acid catalysts. Suitable dicarboxylic acids are derived for example from saturated aliphatic dicarboxylic acids of 2 to 8 carbon atoms, for example oxalic acid, malonic acid, succinic acid, adipic acid and tartaric acid. Suitable aromatic dicarboxylic acids are based on aromatic structures derived from benzene, naphthalene and anthracene, for example terephthalic acid, phthalic acid, isophthalic acid, naphthalenedicarboxylic acids and 9,10-anthracenedicarboxylic acid. Aside from aliphatic and aromatic dicarboxylic acids it is also possible to use diesters of dicarboxylic acids with saturated monohydric alcohols containing 1 to 4 carbon atoms. Preference is given to using the methyl and ethyl esters, for example dimethyl terephthalate, dimethyl oxalate or dimethyl malonate.

Examples of glycols are ethylene glycol, 1,2-propylene glycol, 1,3-propylene glycol, 1,2-butylene glycol, 1,4-butanediol and 1,6-hexanediol.

The polyalkylene glycols are derived from homopolymers or copolymers of ethylene oxide with propylene oxide and/or butylene oxides, for example from homopolymers of ethylene oxide or homopolymers of propylene oxide. The copolymers of ethylene oxide and propylene oxide can be present either as block copolymers or as random copolymers. These copolymers can consist of ethylene oxide and propylene oxide blocks or of ethylene oxide/propylene oxide/ethylene oxide blocks. Similarly it is possible that the block copolymers contain ethylene oxide and propylene oxide units in reverse order. Also suitable are terpolymers which, in addition to ethylene oxide and propylene oxide, also contain a butylene oxide, for example isobutylene oxide, as copolymerized units in the form of blocks or in random distribution. The copolymers cotain up to 30 mole %, preferably from 5 to 30 mole %, of propylene oxide. In the case of terpolymers of ethylene oxide, propylene oxide and butylene oxide, the proportion of propylene oxide and butylene oxide is preferably from 5 to 30 mole %. The polyalkylene oxides are prepared in a conventional manner, for example simply by addition of ethylene oxide onto glycol in the presence of bases as catalyst. However, it is also possible to add alkylene oxides onto polyhydric alcohols, for example onto glycerol, trimethylolpropane, pentoses or hexoses, for example onto pentaerythritol. In these cases, star polymers are obtained. The molecular weight of the polyalkylene oxides is from 300 to 50,000, preferably from 300 to 10,000. Homopolymers of propylene oxide are used in a molecular weight of up to 1,000 for preparing the polyesters. The condensation reaction of the dicarboxylic acids or esters thereof with a polyalkylene glycol with or without an alkylene glycol is carried out in the presence of customary acid catalysts. Suitable catalysts are for example para-toluenesulfonic acid, sulfuric acid, potassium hydrogen sulfate and phosphoric acid. The reaction is carried out at from 100° to 300° C. with removal of water from the reaction mixture. In place of the free acids it is also possible to use the diesters of the dicarboxylic acids in question, in which case the reaction is then carried out in the presence of conventional transesterification catalysts, for example calcium acetate, antimony trioxide, tetrabutyl orthotitanate. The condensation reaction can also be carried out via diglycol ester intermediate by first transesterifying the dialkyl ester, for example dimethyl terephthalate or dimethyl oxalate, in the presence of ethylene glycol and then performing the condensation reaction in the presence of at least one polyalkylene glycol.

The polyester urethanes are prepared by reacting the polyesters described above with diisocyanates. The polyesters used are OH-group determinated. The diisocyanates used are for example hexamethylene diisocyanate, 2,4-toluylene isocyanate or 4,4'-methylenebisphenyl isocyanate. To prepare the polyester urethanes it is also possible to use, instead of or together with the diisocyantes, triisocyanates, for example the addition product of trimethylolpropane and 2,4-toluylene diisocyanate. The preparation of the polyester urethanes is preferably carried out in organic solvents, for example in tetrahydrofuran, acetone, methyl ethyl ketone and ethyl acetate. It is also possible to use solvent mixtures. The solvents should be highly volatile to allow easy removal from the reaction mixture. The preferred solvent is tetrahydrofuran.

The polyester amides are prepared by reacting the dicarboxylic acids in a condensation reaction or their esters in an aminolysis reaction in the absence or the presence of alkylene glycols with amine-functionalized polyalkylene glycols. Suitable amine-functionalized polyalkylene glycols are for example $\alpha,\omega$-diaminopolyethylene glycols having a molecular weight from 300 to 50,000, preferably from 300 to 10,000. To prepare polyester amides it is also possible to react COOH-terminated polyesters with diisocyanates. Suitable polyesters and diisocyanates are those mentioned above.

The molecular weights of polycondensates are known to depend on the condensation conditions. The desired degree of polymerization can be determined for example by means of the amount of water or alcohol formed in the course of the condensation. The polycondensates obtained have a degree of polymerization from 2 to 25, preferably from 2 to 5. The molecular weight of the polyesters, polyester urethanes and polyester amides can be for example from 500 to 100,000, preferably from 500 to 20,000. The polycondensates can have OH, COOH or COOR ($R=C_1$- to $C_4$-alkyl) end groups. The carboxyl groups of polycondensates a) can subsequently be esterified with glycols, for example ethylene glycol or propylene glycols. Similarly, the free OH groups on the polycondensates are available for esterification with carboxylic acids. However, they can also be extended to polyester amide chains by reaction with diisocyanates. In polyester amides, the end groups can be amino groups which may likewise be chain extended by reaction with diisocyanates.

The molecular weight of the low molecular weight polycondensates is determined by osmometry. This method gives the molecular weight in terms of the number of average, so that the degree of polymerization can be calculated. Polycondensates having a number average molecular weight greater than 10,000 g/mol are analyzed by means of the static light scattering method, which ony reveals the weight average. Additionally, the OH number or acid number of the polycondensates is determined.

The graft base a) preferably comprises polyesters of oxalic acid, terephthalic acid and phthalic acid or dimethyl esters thereof with ethylene glycol and polyethylene glycol having a number average molecular weight from 300 to 10,000, it being possible for up to 80 mole % of the diol components to be ethylene glycol.

The above-described polycondensates of component (a) are grafted with monomers (b). Suitable monomers of component (b) are vinyl esters derived from a saturated monocarboxylic acid containing 1 to 6 carbon atoms, and also methyl acrylate, ethyl acrylate, methyl methacrylate, ethyl methacrylate and mixtures thereof. Suitable vinyl esters are for example vinyl formate, vinyl acetate, vinyl propionate, vinyl n-butyrate, vinyl isobutyrate, vinyl valerate, vinyl i-valerate and vinyl caprolate. Of the monomers of group b) preference is given to using vinyl acetate, vinyl propionate, methyl acrylate and mixtures thereof. It is also possible to use acrylic and methacrylic esters which are derived from monohydric saturated alcohols of 3 or 4 carbon atoms. Particularly effective grayness inhibitors are those grafted polycondensates prepared using methyl acrylate as monomer component (b).

The above-described monomers of component b) may be replaced by up to 10% by weight by other monomers. Such monomers are for example styrene, N-vinylimidazole, N-vinylcarbazole, phenyl acrylate, vinylcaprolactam and N,N-dialkylamino-$C_2$- to $C_6$-alkyl (meth)acrylates, for example dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylamino-n-butyl acrylate and dimethylaminoneopentyl acrylate.

The graft polymerization of polycondensate a) is carried out in a conventional manner. The graft polymerization is carried out as usual in the presence of polymerization initiators, but it can also be carried out by the action of high-energy radiation, which includes the action of high-energy electron beams. A possible way of carrying out the graft polymerization comprises for example dissolving the polycondensates of component (a) in at least one monomer of group b), adding a polymerization initiator and polymerizing the mixture to completion. The graft polymerization can for example also be carried out semicontinuously by first introducing a portion, for example 10%, of the mixture to be polymerized, comprising polycondensate of group a), at least one monomer of group b) and initiator, heating to the polymerization temperature and, after the polymerization has started adding the remainder of the mixture to be polymerized at a rate commensurate with the rate of polymerization. The graft polymers can also be obtained by introducing the polycondensates of component (a) in a reactor, heating to the polymerization temperature and adding at least one monomer of group b) and polymerisation initiator either all at once, a little at a time or preferably uninterruptedly, and polymerizing to completion. For every part by weight of polycondensate based on polyester, polyester urethane and polyester amide, from 0.2 to 10, preferably from 0.5 to 6, parts by weight of at least one monomer b) is used.

Suitable polymerization initiators are mainly organic peroxides, such as diacetyl peroxide, dibenzoyl peroxide, succinyl peroxide, di-tert-butyl peroxide, tertbutyl perbenzoate, tert-butylperpivalate, tert-butyl permaleate, cumene hydroperoxide, diisopropyl peroxodicarbamate, bis(o-toluoyl) peroxide, didecanoyl peroxide, dioctanoyl peroxide, dilauroyl peroxide, di-tert-butyl perisobutyrate, tert-butyl peracetate, di-tert-amyl peroxide, tert-butyl hydroperoxide and mixtures thereof, redox initiators and azo starters.

The graft polymerization is carried out at from 50° to 200° C., preferably at from 70° to 140° C. It is customarily carried out under atmospheric pressure, but can also be carried out under reduced or superatmospheric pressure. If desired, the graft polymerization described above can also be carried out in a solvent. Suitable solvents are for example alcohols, eg. methanol, ethanol, n-propanol, isopropanol, n-butanol, sec-butanol, tertbutanol, n-pentanol, n-hexanol and cyclohexanol, and also glycols, such as ethylene glycol, propylene glycol and butylene glycol, such as the methyl or ethyl ethers of 2-hydric alcohols, diethylene glycol, triethylene glycol, glycerol and dioxane. The graft polymerization can also be carried out in water as solvent. In this case, the first step is to introduce a solution which, depending on the amount of added monomers of component b), is more or less soluble in water. To transfer water-insoluble products which can form during the graft polymerization into solution, it is possible for example to add organic solvents to the reaction mixture, for example isopropanol, n-propanol, methanol, acetone, dimethylformamide or even ionic or nonionic surfactants. It is even possible to use protective colloids, for example polyvinyl alcohol, for this purpose.

Depending on consistency, the polyester urethanes are grafted in the melt or in solution in an organic solvent, for example n-butanol or glycol. If the polyester urethane is in solution in a strongly polymerization-regulating solvent, for example in tetrahydrofuran, a solvent exchange should be effected. If solutions of graft polymer are prepared in an organic solvent or in mixtures of an organic solvent and water, from 5 to 200, preferably from 10 to 100, parts by weight of organic solvent or solvent mixture are used per 100 parts by weight of graft polymer.

Graft polymers have a K value from 5 to 200, preferably from 5 to 70 (determined according to H. Fikentscher in 2% strength by weight in dimethylformamide at 25° C.).

The graft polymers described above are used as grayness inhibitors according to the invention in detergents of reduced phosphate content (which is to be understood as meaning a phosphate content of less than 25% by weight of sodium triphosphate) or in phosphate-free detergents. For grayness inhibition in the wash, the graft polymers described above are added to commercially available detergent formulations in an amount from 0.1 to 5, preferably from 0.3 to 3, % by weight, based on the detergent mixture. For addition to detergent formulation the graft polymers can be in the form of a paste or of a highly viscous material, or as a dispersion or solution in a solvent. The graft polymers can also be adsorbed on the surface of additives, for example sodium sulfate, or builders (zeolites) and other solid assistants making up the detergent formulation.

Commercially available pulverulent detergents whose phosphate content is below 25% by weight and those which contain no phosphate at all contain as an essential constituent surfactants, for example $C_8$- to $C_{12}$-alkylphenol ethoxylates, $C_{12}$- to $C_{20}$-alcohol ethoxylates, and also block copolymers of ethylene oxide and propylene oxide. The polyalkylene oxides are linear or branched reaction products of ethylene oxide with propylene oxide and/or isobutylene oxide which have a block structure or which can also have a random structure. The end groups of the polyalkylene oxides are capped or uncapped. The term capping as used herein is to be understood as meaning that the free OH groups of the polyalkylene oxides can be etherified and/or esterified and/or aminated and/or reacted with isocyanates.

Other suitable constituents of pulverulent detergents are anionic surfactants, such as $C_8$- to $C_{12}$-alkylbenzenesulfonates, $C_{12}$- to $C_{16}$-alkanesulfonates, $C_{12}$- to $C_{16}$-alkylsulfates, $C_{12}$- to $C_{16}$-alkylsulfosuccinates and sulfated ethoxylated $C_{12}$- to $C_{16}$-alkanols. Pulverulent detergents customarily contain from 5 to 20% by weight of a surfactant or a mixture of surfactants.

The pulverulent detergents may optionally also contain polycarboxylic acids or salts thereof, for example tartaric acid and citric acid.

A further important constituent of detergent formulations are incrustation inhibitors. These substances are for example homopolymers of acrylic acid, methacrylic acid and maleic acid and copolymers, for example copolymers of maleic acid and acrylic acid, copolymers of maleic acid and methacrylic acid and copolymers of (a) acrylic acid and/or methacrylic acid with b) acrylic esters, methacrylic esters, vinyl esters, allyl esters, itaconic esters, itaconic acid, methylenemalonic acid, methylenemalonic esters, crotonic acid and crotonic esters. Also suitable are copolymers of olefins and $C_1$- to $C_4$- alkyl vinyl ethers. The molecular weight of the homopolymer or copolymer is from 1,000 to 100,000, The incrustation inhibitors are used in an amount of from 0.5 to 10% by weight in detergents, where they are used in nonneutralized form, as an alkali metal or ammonium salt, and also in partially neutralized form, where for example from 40 to 60% of the carboxyl groups are neutralized.

Further possible constituents of detergents are corrosion inhibitors, monomeric, oligomeric and polymeric phosphonates, ether sulfonates based on unsaturated fatty alcohols, for example oleyl alcohol ethoxylate butyl ether and alkali metal salts thereof. Pulverulent detergents may also contain zeolites, for example in an amount of from 5 to 30% by weight. The detergent formulations may also contain bleaching agents. If bleaching agents are used, they are customarily employed in amounts of from 3 to 25% by weight. A suitable bleaching agent is for example sodium perborate. The detergent formulations may also contain bleach activators, softeners, antifoams, scent, optical brighteners and enzymes. Additives, for example sodium sulfate, may be present in the detergent in an amount of up to 40% by weight.

The graft polymers described above can also be used as additives in liquid detergents. Liquid detergents contain as admixture component liquid or even solid surfactants which are soluble or at least dispersible in the detergent formulation. The surfactant content in liquid detergents is customarily within the range from 15 to 50% by weight. Suitable surfactants for this purpose are those products which are also used in pulverulent detergents, and also liquid polyalkylene oxides or polyalkoxylated compounds. If the graft polymers are not directly miscible with the other constituents of the liquid detergent, a homogeneous mixture can be prepared by means of small amounts of solubilizers, for example water, or of a water-miscible organic solvent, for example isopropanol, methanol, ethanol, glycol, diethylene glycol or triethylene glycol.

In the examples, the parts and percentages are by weight. The K values of the graft polymers were determined according to H. Fikentscher, Cellulosechemie, 13, (1932), 58–64, 71–74, in a polymer concentration of 2% strength by weight in dimethylformamide at 25° C. The molecular weights are number average or weight average molecular weights.

PREPARATION OF POLYCONDENSATES

Polycondensate 1:

In a 2 L capacity flask, 1,200 g of polyethylene glycol of molecular weight 300 (4 moles), 528 g (4 moles) of dimethyl malonate, 1.2 g of calcium acetate and 0.32 g of antimony oxide are melted and flushed for 30 minutes with nitrogen. The reaction mixture is then heated wtih stirring to 150° C. The methanol formed in the course of the reaction is distilled off through a packed column mounted on a distillation attachment. The temperature of the reaction mixture is gradually raised to 275° C. Methanol is removed until the polyester has a number average molecular weight of 1,680. The OH number of the polyester is 45.

Polycondensates 2 to 7:

The method for the preparation of polycondensate 1 is repeated, except that the starting materials indicated in Table 1 are used. The polyesters obtained are likewise characterized in Table 1.

Polycondensate 8:

In a 2 l capacity flask, 166 g of terephthalic acid, 600g of polyethylene glycol of number average molecular weight 1,500, 120 g of ethylene glycol and 0.98 g of p-toluenesulfonic acid and 1.77g of phosphorous acid are melted under a stream of nitrogen. The temperature of the reaction mixture is gradually raised to 230° C. 140 g of glycol are added uninterruptedly in the course of 7 hours. Using a slow stream of nitrogen the glycol/water mixture formed in the course of the condensation is distilled off until a polyester having a number average molecular weight from 2,500 to 3,000 is obtained. The polyester has a OH number of 45 and an acid number of 1.0.

Polycondensate 9:

In a 2 l capacity flask, 1,650 g of polyethylene glycol of number average molecular weight 1,500, 214 g of dimethyl phthalate, 0.51 g of calcium acetate and 0.13 g of antimony trioxide are melted under a slow stream of nitrogen and heated to 250° C. The temperature of the reaction mixture is raised to 275° C. in the course of 4 hours. To remove the methanol formed in the course of the transesterification from the reaction mixture, the pressure is reduced to 4 mbar. The polyester obtained in this way has a number average molecular weight of 5,100 and an OH number of 14.

patent specification, has a weight average molecular weight of 25,000.

Polycondensate 12:

In a 2 l capacity flask, 0.168 mole of bis($\beta$-hydroxyethyl) terephthalate, 0.0627 mole of glycol and 151.2 g of polyethylene oxide of number average molecular weight 1,500 are dissolved in 301.5 g of tetrahydrofuran, and the solution is heated in a slow stream of nitrogen to 66° C. 0.336 mole of hexamethylene diisocyanate dissolved in 85 g of tetrahydrofuran is added dropwise in the course of 1 hour. The reaction is catalyzed by the addition of 2 drops of dibutyltin dilaurate. Since the viscosity of the reaction mixture increases in the course of the condensation, 200 g of tetrahydrofuran are added during the condensation. There is then a wait until the viscosity of the reaction mixture has risen again strongly, and the reaction is then stopped by addition of 0.13 g of di(n-butyl)amine in 5 g of tetrahydrofuran. The tetrahydrofuran is then distilled off under reduced pressure and replaced by addition of glycol, the internal temperature being raised to 90° C. The weight average molecular weight is 15,300.

Polycondensate 13:

The method of preparation used for polycondensate 12 is repeated, except that the dicarboxylic ester used is dimethyl oxalate, affording a polyester urethane of weight average molecular weight 10,800.

Polycondensate 14:

0.5 mole of an ammonia-aminated polyethylene glycol of molecular weight 1,500, 0.5 mole of dimethyl terephthalate and 5% of ammonium chloride, based on aminated polyethylene oxide, are melted under nitrogen and then, still under nitrogen, heated to 265° C. Methanol is distilled out of the reaction mixture in the course of from 45 to 60 minutes. A polyester amide is obtained having a weight average molecular weight of 12,500.

TABLE 1

| Polycondensate No. | Molecular weight of polyethylene glycol | Molar ratio PEG:EG | Dicarboxylic acid component and other components | Molecular weight of polycondensate |
|---|---|---|---|---|
| 1 | 300 | 1:0 | Dimethyl malonate | 1,700 |
| 2 | 600 | 1:0 | Dimethyl malonate | 1,840 |
| 3 | 1,500 | 1:0 | Dimethyl malonate | 2,300 |
| 4 | 600 | 1:0 | Dimethyl oxalate | 3,000 |
| 5 | 1,500 | 1:0 | Dimethyl oxalate | 2,800 |
| 6 | 600 | 1:0 | Dimethyl oxalate | 2,200 |
| 7 | 600 | 1:0 | Dimethyl oxalate | 2,500 |
| 8 | 1,500 | 1:2 | Terephthalic acid | 2,800 |
| 9 | 1,500 | 1:0 | Dimethyl phthalate | 5,100 |
| 10 | 1,500 | 1:0 | DMT[(1)] | 2,700 |
| 11 | 5,000 | 0.8:0.2 | DMT[(1)] | 25,000 |
| 12 | 1,500 | 1:0.6 | Bis($\beta$-hydroxyethyl) terephthalate, HMDI[(2)] | 15,300 |
| 13 | 1,500 | 1:0 | Dimethyl oxalate and HMDI | 10,800 |
| 14 | 1,500 | 1:0 | DMT | 12,500 |

[(1)]DMT = Dimethyl terephthalate
[(2)]HMDI = Hexamethylene diisocyanate

Polycondensate 10:

The method of preparation for polycondensate 9 is repeated, except that the dimethyl phthalate is replaced by dimethyl terephthalate. The polyester thus obtained has an OH number of 20.

Polycondensate 11;

Example 11 of U.S. Pat. No. 3,557,039 is followed to convert a polyalkylene glycol of a number average molecular weight of 6,000, glycol and dimethyl terephthalate into a polyester which, according to said

PREPARATION OF GRAFT POLYMERS

The graft polymers are prepared for example by the method known from DE Patent 1,077,430 by heating each of the polycondensates 1 to 11 and 14 to 90°–95° C. under nitrogen, flushing with nitrogen for 20 minutes, and then adding the monomers and the initiator dropwise together or separately. The polymerization initiator used is 1.5% of dibenzoyl peroxide, based on the polycondensates used. The monomers are metered in over 180 to 240 minutes. The addition of initiator is preferably started at the same time as the addition of monomer and is preferably adjusted to such a rate that not all of the initiator will have been introduced into the reaction mixture until 1 hour after the end of the addition of monomer. The initiator is dissolved in ethyl acetate and is introduced into the reaction mixture in that form. After completion of the addition of initiator the reaction mixture is stirred at 95° C. for a further 2–4 hours. The high volatiles, such as ethyl acetate, are then removed, and the reaction mixture is diluted by the dropwise addition of water over 2 hours. Depending on the weight proportion of the hydrophobic component, the result obtained is an aqueous solution or an opaque or milky dispersion.

Grafting of polycondensates 12 and 13:

257 g of a solution of polymer 12 or 13 in glycol is mixed dropwise at 95° C. with 129 g of vinyl acetate in the course of 3 hours and with 5.4 g of di-tert-butyl peroxide (75% strength in water) dissolved in 40 g of ethyl acetate in the course of 4 hours. The reaction is accompanied by a substantial increase in viscosity. Therefore, 900 g of glycol are added to the reaction mixture, and after the initiator has been added heating is continued at 95° C. for a further 4 hours. 250 g of the solution thus obtained are then diluted at 100° C. with 250 g of dimethylformamide. 333 g of water are then added to this mixture to give a pale brown highly viscous dispersion.

The graft polymers prepared are indicated in Table 2.

TABLE 2

| Graft polymer No. | | Weight ratio polycondensate/monomer | K value (2% in DMF[4]) |
|---|---|---|---|
| 1 | Polycondensate 1/VAc[1] | 1:1.75 | 24.8 |
| 2 | Polycondensate 1/VAc[1] | 1:2.0 | 27.1 |
| 3 | Polycondensate 2/VAc[1] | 1:1.75 | 22.1 |
| 4 | Polycondensate 2/VAc[1] | 1:2.0 | 23.5 |
| 5 | Polycondensate 3/VAc[1] | 1:1.75 | 21.5 |
| 6 | Polycondensate 3/VAc[1] | 1:2.0 | 21.9 |
| 7 | Polycondensate 4/VAc[1] | 1:1.75 | 22.6 |
| 8 | Polycondensate 4/VAc[1] | 1:2.0 | 23.4 |
| 9 | Polycondensate 5/VAc[1] | 1:1.75 | 21.2 |
| 10 | Polycondensate 5/VAc[1] | 1:2.0 | 21.5 |
| 11 | Polycondensate 7/VAc[1] | 1:1.75 | 20.5 |
| 12 | Polycondensate 7/VAc[1] | 1:2.0 | 21.7 |
| 13 | Polycondensate 6/VAc[1] | 1:1.75 | 19.4 |
| 14 | Polycondensate 6/VAc[1] | 1:2.0 | 19.7 |
| 15 | Polycondensate 7/VAc[1] | 1:2.25 | 22.3 |
| 16 | Polycondensate 8/VAc[1] | 1:0.1 | 21.5 |
| 16a | Polycondensate 8/VAc[1] | 1:0.75 | 21.9 |
| 17 | Polycondensate 8/VAc[1] | 1:1.0 | 22.6 |
| 18 | Polycondensate 8/VAc[1] | 1:1.5 | 20.9 |
| 19 | Polycondensate 8/VAc[1] | 1:2.0 | 22.5 |
| 20 | Polycondensate 8/VAc[1] | 1:0.25 | 20.3 |
| 21 | Polycondensate 8/VAc[1] | 1:0.5 | 20.6 |
| 22 | Polycondensate 8/VPr[2] | 1:0.75 | 18.6 |
| 23 | Polycondensate 8/VPr[2] | 1:1.0 | 19.9 |
| 24 | Polycondensate 8/VPr[2] | 1:1.5 | 20.7 |
| 25 | Polycondensate 8/MA[3] | 1:0.75 | 20.5 |
| 26 | Polycondensate 8/MA[3] | 1:1.0 | 25.7 |
| 27 | Polycondensate 8/MA[3] | 1:1.5 | 30.7 |
| 28 | Polycondensate 8/MA[3] | 1:2.0 | 35.2 |
| 29 | Polycondensate 11/VAc | 1:0.5 | 39.2 |
| 30 | Polycondensate 11/VAc | 1:1.0 | 40.5 |
| 31 | Polycondensate 11/VAc | 1:1.5 | 41.8 |
| 32 | Polycondensate 11/VAc | 1:0.1 | 38.1 |
| 33 | Polycondensate 10/VAc | 1:1.75 | 24.0 |
| 34 | Polycondensate 10/VAc | 1:2.0 | 27.4 |
| 35 | Polycondensate 10/VAc | 1:0.1 | 19.4 |
| 36 | Polycondensate 9/VAc | 1:1.75 | 36.5 |
| 37 | Polycondensate 9/VAc | 1:2.0 | 43.4 |
| 38 | Polycondensate 12/VAc | 1:0.5 | 15.5 |
| 39 | Polycondensate 12/VAc | 1:1.0 | 17.9 |
| 40 | Polycondensate 13/VAc | 1:2.0 | 24.5 |
| 41 | Polycondensate 14/VAc | 1:1.5 | 28.3 |
| 42 | Polycondensate 14/VAc | 1:2.0 | 30.5 |

[1]VAc = Vinyl acetate
[2]VPr = Vinyl propionate
[3]MA = Methyl acrylate
[4]DMF = Dimethylformamide The grayness-inhibiting action of above-described graft polymers 1 to 42 was tested as follows:

Polyester (PES) test fabrics and polyester/cotton (PES/Co) blend fabrics were subjected to a series of 3 washes together with a standard soil cloth (WFK 10D). The soil cloth is renewed after every wash, the test fabric becoming more soiled in every wash. The whiteness of the test fabric after the third wash is used to assess the degree of soiling. Confidence in the results is increased by multiple replication and averaging. Photometric measurement of the reflectance in % was carried out in the present case at a wavelength of 460 nm (barium primary white standard as laid down in German Standard Specification DIN 5,033) on an Elrepho 2000 (Datacolor).

| Test conditions | |
|---|---|
| Test equipment | Launder-O-meter |
| Water hardness | 3.5 mmol of Ca/l, Ca:Mg = 3:2 |
| Liquor quantity | 250 ml |
| Liquor ratio | 10:1 |
| Test temperature | 35 to 60° C. |
| Test duration | 30 minutes (with heating-up time) |
| Detergent concentration | 8 g/l |

In the Examples, the grayness inhibitor was added in an amount of 0.3 or 0.5%, based on the test detergent. The test vessels each contained 15 g of test fabric (5 g of polyester, 5 g of polyester/cotton blend and 5 g of cotton fabric) and 10 g of soil cloth. The soil cloth used was cotton soil cloth from the Krefeld laundry research station, specifically WFK 10D.

The test detergent used had the following composition:

| | |
|---|---|
| $C_{12}$-alkylbenzenesulfonate | 6.25% |
| Tallow fat alcohol reacted with 11 ethylene oxide | 4.7% |
| Soap | 2.8% |
| Na triphosphate (90% retention) | 20% |
| Na perborate (tetrahydrate) | 20% |
| $Na_2SO_4$ | 24% |
| Sodium disilicate | 6% |
| Mg silicate | 1.25% |
| Carboxymethylcellulose (CMC), Na salt | 0.6% |
| Tetrasodium salt of ethylenediamine-tetraacetic acid | 0.2% |
| Remainder water ad | 100%. |

The test detergent is thus a phosphate-reduced detergent of the type commercially available since the second stage of the provisions of the West German Detergents Act concerning the maximum quantity of phosphate came into force in January 1984.

Table 3 shows the increase in the reflectance of polyester (PES) and polyester/cotton (PES/Co) blend fabrics after addition of the graft polyers to be used according to the invention to test detergent.

TABLE 3

| Example | Graft polymer No. | % reflectance at PES fabric | PES/Co blend fabric |
|---|---|---|---|
| | | Concentration used: 0.3% | |
| 1 | 1 | 65.7 | 76.2 |
| 2 | 2 | 68.5 | 76.9 |
| 3 | 3 | 67.4 | 76.9 |
| 4 | 4 | 67.8 | 77.4 |
| 5 | 5 | 70.7 | 77.2 |
| 6 | 6 | 69.2 | 74.2 |
| 7 | 7 | 67.3 | 75.2 |
| 8 | 8 | 68.4 | 76.1 |
| 9 | 9 | 69.5 | 77.3 |
| 10 | 10 | 71.8 | 77.7 |
| 11 | 11 | 68.7 | 76.8 |
| 12 | 12 | 69.3 | 76.1 |
| 13 | 13 | 63.0 | 72.8 |
| 14 | 14 | 59.7 | 73.8 |
| 15 | 15 | 70.6 | 75.6 |
| 16 | 16 | 72.4 | 79.4 |
| 17 | 17 | 74.9 | 77.0 |
| 18 | 18 | 75.0 | 79.0 |
| 19 | 19 | 74.7 | 78.9 |
| | | Concentration used: 0.5% | |
| 20 | 22 | 74.5 | 78.4 |
| 21 | 23 | 74.0 | 75.5 |
| 22 | 24 | 72.6 | 76.8 |
| 23 | 25 | 75.9 | 80.2 |
| 24 | 26 | 74.7 | 78.4 |
| 25 | 27 | 72.2 | 76.5 |
| 26 | 28 | 69.5 | 72.4 |
| | | Concentration used: 0.3% | |
| 27 | 29 | 67.3 | 75.3 |
| 28 | 30 | 72.9 | 78.5 |
| 29 | 31 | 73.4 | 77.9 |
| 30 | 32 | 74.9 | 78.4 |
| 31 | 33 | 70.1 | 76.0 |
| 32 | 34 | 71.3 | 78.5 |
| 33 | 35 | 73.0 | 78.4 |
| 34 | 36 | 74.3 | 78.1 |
| 35 | 37 | 74.0 | 78.7 |
| 36 | 38 | 61.1 | 75.2 |
| 37 | 39 | 61.2 | 71.2 |
| 38 | 40 | 72.2 | 74.1 |
| 39 | 41 | 67.7 | 71.6 |
| 40 | 42 | 69.4 | 73.1 |

The test detergent specified above was also tested together with the quantities of graft polymer given in Table 4 in the presence of another soil cloth, namely EMPA 104 cloth (Swiss Materials Testing Institute, St. Gallen, Switzerland). This produced the values given in Table 4 for the reflectance at polyester fabric and blend fabric of polyester and cotton.

TABLE 4

| | | The soil cloth used was EMPA 104 cloth | |
|---|---|---|---|
| Example | Graft polymer No. | % reflectance at PES fabric | PES/Co blend fabric |
| | | Concentration used: 0.3% | |
| 41 | 7 | 76.3 | 81.2 |
| 42 | 8 | 76.8 | 81.1 |
| 43 | 9 | 76.1 | 80.0 |
| 44 | 10 | 76.0 | 81.3 |
| 45 | 11 | 75.7 | 80.8 |
| 46 | 12 | 75.4 | 80.3 |
| 47 | 13 | 73.7 | 77.0 |
| 48 | 14 | 74.6 | 77.6 |
| 49 | 15 | 76.0 | 80.9 |
| 50 | 16 | 63.4 | 65.2 |
| 51 | 16a | 66.4 | 63.6 |

TABLE 4-continued

| | | The soil cloth used was EMPA 104 cloth | |
|---|---|---|---|
| Example | Graft polymer No. | % reflectance at PES fabric | PES/Co blend fabric |
| 52 | 17 | 69.0 | 66.2 |
| 53 | 18 | 72.2 | 78.9 |
| 54 | 19 | 72.4 | 77.0 |
| 55 | 33 | 73.8 | 74.9 |
| 56 | 34 | 74.4 | 76.9 |
| 57 | 36 | 66.0 | 70.9 |
| 58 | 37 | 60.9 | 64.0 |
| 59 | 32 | 63.5 | 64.2 |
| 60 | 29 | 66.3 | 78.1 |
| 61 | 30 | 63.3 | 76.0 |
| 62 | 31 | 63.3 | 74.4 |

Tables 5 and 6 give the results of Comparative Examples where the test detergent described above either contains no additives (Comparative Examples 1 and 22) or contains the particular additives specified in Tables 5 and 6 in an amount of 0.3% by weight. As a comparison of the Examples with the Comparative Examples reveals, the graft polymers have a marked grayness-inhibiting action compared with the underlying ungrafted polycondensates. Nor do polyvinyl acetate and polyvinyl propionate dispersions show any grayness-inhibiting action in the test detergent.

TABLE 5

| | | The soil cloth used was WFK 10D cloth. | |
|---|---|---|---|
| Comparative Example | Polycondensate No. | % reflection at PES fabric | PES/Co blend fabric |
| 1 | without additive | 45.3 | 61.2 |
| 2 | PEO[1] (Mn = 1 500) | 46.2 | 61.8 |
| 3 | PEO (Mn = 6 000) | 45.5 | 62.9 |
| 4 | 1 | 44.1 | 60.3 |
| 5 | 2 | 45.2 | 62.8 |
| 6 | 3 | 42.5 | 62.1 |
| 7 | 4 | 42.8 | 60.2 |
| 8 | 5 | 43.4 | 61.0 |
| 9 | 6 | 44.1 | 60.9 |
| 10 | 7 | 42.2 | 60.5 |
| 11 | 8 | 64.3 | 72.0 |
| 12 | 9 | 62.5 | 68.1 |
| 13 | 10 | 63.9 | 70.6 |
| 14 | 11 | 64.1 | 71.8 |
| 15 | 12 | 58.2 | 66.5 |
| 16 | 13 | 63.6 | 68.9 |
| 17 | 14 | 59.9 | 70.1 |
| 18 | PVAc[2] dispersion (K value of polymer 42.0) | 44.8 | 58.9 |
| 19 | PVPr[3] dispersion (K value of polymer 51.7) | 43.9 | 57.1 |
| 20 | PMA[4] dispersion (K value of polymer 63.2) | 43.1 | 59.5 |
| 21 | Mixture of polycondensate 1 and PVAc dispersion in weight ratio of 1:2 | 45.4 | 57.2 |

[1] PEO = Polyethylene oxide
[2] PVAc = Polyvinyl acetate
[3] PVPr = Polyvinyl propionate
[4] PMA = Polymethyl acrylate

TABLE 6

| | | The soil cloth used was EMPA 104 cloth | |
|---|---|---|---|
| Comparative Example | Polycondensate No. | % reflection at PES fabric | PES/Co blend fabric |
| 22 | without additive | 54.0 | 64.1 |
| 23 | PEO (Mn = 1 500) | 54.2 | 63.7 |
| 24 | PEO (Mn = 6 000) | 54.8 | 64.2 |
| 25 | 1 | 54.9 | 64.3 |

TABLE 6-continued

The soil cloth used was EMPA 104 cloth

| Comparative Example | Polycondensate No. | % reflection at PES fabric | % reflection at PES/Co blend fabric |
|---|---|---|---|
| 26 | 2 | 54.7 | 65.2 |
| 27 | 3 | 53.4 | 64.8 |
| 28 | 4 | 55.1 | 64.7 |
| 29 | 5 | 54.2 | 63.9 |
| 30 | 6 | 53.9 | 64.8 |
| 31 | 7 | 54.9 | 65.4 |
| 32 | 8 | 56.9 | 52.8 |
| 33 | 11 | 62.7 | 61.5 |
| 34 | 10 | 61.8 | 62.3 |
| 35 | 9 | 63.2 | 63.4 |
| 36 | PVAc dispersion (K value 42) | 52.5 | 56.2 |
| 37 | PVPr dispersion (K value 51.7) | 53.1 | 56.8 |
| 38 | PMA dispersion | 51.9 | 54.7 |
| 39 | Mixture of polymer 1 and PVAc dispersion (K value 42) in weight ratio of 1:2) | 53.2 | 55.9 |

We claim:

1. A detergent comprising surfactants and builders which contains, as an added soil antiredeposition agent, from 0.1 to 5% by weight of a graft polymer which is obtainable by grafting
    (a) polycondensates based on polyesters, polyester urethanes and polyester amides of a number average molecular weight from in each case 500 to 100,000 with
    (b) from 0.2 to 10 parts by weight, based on 1 part by weight of the polycondensates, of esters selected from the group consisting of the vinyl esters of saturated $C_1$- to $C_6$- carboxylic acids, acrylic and/or methacrylic esters of saturated monohydric alcohols containing 1 to 4 carbon atoms.

2. A detergent as claimed in claim 1, wherein component (a) comprises polyesters obtainable by condensation of dicarboxylic acids or esters thereof with glycols and/or polyalkylene glycols of number average molecular weight from 300 to 50,000.

3. A detergent as claimed in claim 1, wherein component (a) comprises polyester urethanes obtainable by condensation of dicarboxylic acids and/or esters thereof with glycols and/or polyalkylene glycols of number average molecular weight from 300 to 50,000 in the presence of diisocyanates or polyisocyanates.

4. A detergent as claimed in claim 1, wherein component a) comprises polyester amides obtainable by condensation of dicarboxylic acids and/or esters thereof with aminated polyalkylene oxides of number average molecular weight from 300 to 50,000.

5. A detergent as claimed in claim 1, wherein component (b) comprises an ester selected from the group consisting of vinyl acetate, vinyl propionate, methyl acrylate, ethyl acrylate, methyl methacrylate, ethyl methacrylate and mixtures thereof.

6. A detergent as claimed in claim 1, wherein the graft polymer added as a soil antiredeposition agent is obtainable by grafting
    (a) polyesters of dicarboxylic acids or esters thereof with ethylene glycol and polyethylene glycol of number average molecular weight from 300 to 10,000, where up to 80 mole % of the diol components can be ethylene glycol,
    (b) vinyl acetate, methyl acrylate or mixtures thereof.

7. A process for soil antiredeposition during washing with detergents having a reduced phosphate content of less than 25 percent by weight of sodium triphosphate, which comprises using as an added soil antiredeposition agent, from 0.1 to 5 percent by weight of a graft polymer which is obtainable by grafting
    (a) polycondensates based on polyesters, polyester urethanes and polyester amides of a number average molecular weight from, in each case, 500 to 100,000 with
    (b) from 0.2 to 10 parts by weight, based on 1 part by weight of the polycondensate, of esters selected from the group consisting of the vinyl esters of saturated $C_1$- to $C_6$- carboxylic acids, acrylic and/or methacrylic esters of saturated monohydric alcohols containing 1 to 4 carbon atoms.

8. A process as claimed in claim 7, wherein the graft polymer used as a soil antiredeposition agent contains as component (a) polyesters obtainable by condensation of dicarboxylic acids or esters thereof with glycols and/or polyalkylene glycols of number average molecular weight from 300 to 50,000.

9. A process as claimed in claim 7, wherein the graft polymer used as a soil antiredeposition agent contains as component (a) polyester urethanes obtainable by condensation of dicarboxylic acids and/or esters thereof with glycols and/or polyalkylene glycols of number average molecular weight from 300 to 50,000 in the presence of diisocyanates or polyisocyanates.

10. A process as claimed in claim 7, wherein the graft polymer used as a soil antiredeposition agent contains as component (a) polyester amides obtainable by condensation of dicarboxylic acids and/or esters thereof with aminated polyalkylene oxides of number average molecular weight from 300 to 50,000.

11. A process as claimed in claim 7, wherein the graft polymer used as a soil antiredeposition agent contains as component (b) an ester selected from the group consisting of vinyl acetate, vinyl propionate, methyl acrylate, ethyl acrylate, methyl methacrylate, ethyl methacrylate and mixtures thereof.

12. A process as claimed in claim 7, wherein the graft polymer used as a soil antiredeposition agent is obtainable by grafting
    (a) polyesters of dicarboxylic acids or esters thereof with ethylene glycol and polyethylene glycol of number average molecular weight from 300 to 10,000, where up to 80 mole % of the diol components can be ethylene glycol,
    (b) vinyl acetate, methyl acrylate or mixtures thereof.

* * * * *